United States Patent
Ernst et al.

(10) Patent No.: US 9,556,819 B2
(45) Date of Patent: Jan. 31, 2017

(54) WORKPIECE HAVING A CUT-OUT FOR RECEIVING A PISTON

(71) Applicant: SULZER METCO AG, Wohlen (CH)

(72) Inventors: Peter Ernst, Stadel b. Niederglatt (CH); Bernd Distler, Elmont, NY (US)

(73) Assignee: OERLIKON METCO AG, Wohlen, Wohlen (CH)

(*) Notice: Subject to any disclaimer, the term of this patent is extended or adjusted under 35 U.S.C. 154(b) by 0 days.

(21) Appl. No.: 14/338,935

(22) Filed: Jul. 23, 2014

(65) Prior Publication Data

US 2015/0027398 A1  Jan. 29, 2015

(30) Foreign Application Priority Data

Jul. 26, 2013 (EP) ................... 13178145

(51) Int. Cl.
| | |
|---|---|
| *B23P 11/00* | (2006.01) |
| *F02F 1/00* | (2006.01) |
| *F02F 1/08* | (2006.01) |
| *F16J 10/04* | (2006.01) |
| *F02F 1/02* | (2006.01) |
| *F02F 7/00* | (2006.01) |

(52) U.S. Cl.
CPC ................ *F02F 1/004* (2013.01); *F02F 1/00* (2013.01); *F02F 1/02* (2013.01); *F02F 1/08* (2013.01); *F02F 7/0002* (2013.01); *F16J 10/04* (2013.01); *F05C 2253/12* (2013.01)

(58) Field of Classification Search
CPC ........... C10M 111/04; C10M 2201/043; C10M 2213/023; C10M 2217/0443; C10N 2040/25; C01M 2201/04; C01M 2201/101413; F02F 3/00; F02F 3/015; F02F 3/105

USPC ....................................... 123/193.2
See application file for complete search history.

(56) References Cited

U.S. PATENT DOCUMENTS

| | | | |
|---|---|---|---|
| 4,523,554 A * | 6/1985 | Ryu ........................... | 123/193.2 |
| 6,044,820 A | 4/2000 | Domanchuk | |
| 2001/0037786 A1* | 11/2001 | Fischer et al. ............. | 123/193.2 |
| 2002/0011243 A1 | 1/2002 | Barbezat | |
| 2002/0051851 A1 | 5/2002 | Barbezat | |
| 2005/0235944 A1* | 10/2005 | Michioka .................... | 123/193.2 |
| 2007/0143996 A1 | 6/2007 | Michioka | |
| 2013/0047947 A1 | 2/2013 | Whitbeck | |

(Continued)

FOREIGN PATENT DOCUMENTS

| | | |
|---|---|---|
| EP | 1 022 351 | 7/2000 |
| EP | 1 174 524 | 1/2002 |

(Continued)

OTHER PUBLICATIONS

EPO Search Report issued in counterpart EP application No. 13178145.2.

*Primary Examiner* — Marguerite McMahon
(74) *Attorney, Agent, or Firm* — Greenblum & Bernstein, P.L.C.

(57) ABSTRACT

The invention provides for a cylinder bore coating system that includes at least one cylinder bore configured to receive an axially movable piston. The at least one cylinder bore has a recessed area having an axial length and a radial depth. A first coating layer is arranged within at least the recessed area. A second coating layer covers the first coating layer and a portion of the at least one cylinder bore axially spaced from the recessed area.

21 Claims, 3 Drawing Sheets

(56) References Cited

U.S. PATENT DOCUMENTS

2013/0129939 A1    5/2013  Silk
2013/0340700 A1   12/2013  Donahue

FOREIGN PATENT DOCUMENTS

| EP | 1 507 020 | 2/2005 |
| EP | 2 677 152 | 12/2013 |
| JP | 1-155061 | 6/1989 |

* cited by examiner

WORKPIECE HAVING A CUT-OUT FOR RECEIVING A PISTON

CROSS-REFERENCE TO RELATED APPLICATIONS

The present application claims priority under 35 U.S.C. §119(a) of European Patent Application No. EP 131 78 145.2 filed Jul. 26, 2013, the disclosure of which is expressly incorporated by reference herein in its entirety.

BACKGROUND OF THE INVENTION

1. Field of the Invention

The invention relates to a cylinder bore coating system and method of coating a cylinder bore.

2. Discussion of Background Information

A workpiece in the form of an engine block or of a crankcase of an internal combustion engine is described in EP 1 022 351 A1 which has a plurality of cylinder bores for receiving a piston movable to and from along an axial direction. The cylinder bores in the form of the piston receiving cylinders have a coating which forms a running surface for the piston, with the running surface being hollow-cylindrical in shape. The coating is applied to achieve a coefficient of friction between the piston and the cylinder which is as small as possible and additionally to achieve a very small tendency to scuffing.

In addition to the named effects of the coating, it also influences a heat exchange between the cylinder and a coolant flowing around the cylinder. The thicker the coating is, the smaller the named heat exchange typically is. The heat exchange can thus be influenced by the selection of the thickness of the coating.

SUMMARY OF THE EMBODIMENTS

Against this background, the invention proposes a workpiece having a cylinder bore for receiving a piston, wherein a desired heat transfer from regions of the cylinder bore into an environment of the workpiece can be set particularly exactly.

The workpiece in accordance with the invention has a base body which has a cylinder bore for receiving a piston movable to and fro along an axial direction. The cylinder bore has a coating which forms a running surface for the piston. The running surface is in this respect hollow-cylindrical in shape.

In accordance with the invention, the cylinder bore of the base body has a shape different from the shape of a hollow cylinder in the region of the running surface. Since the running surface for the piston is hollow-cylindrical, a different thickness of the coating results in the region of the running surface. The cylinder bore thus has a shape differing from the shape of a hollow cylinder in every case in the axial region in which the piston moves to and fro. An ideal heat transfer can thus be set by a suitable choice of the contour of the cylinder bore and thus of the thickness of the coating for every region of the cylinder bore.

In addition, the coating can be thicker in regions with increased wear.

The named workpiece is in particular designed as an engine block or as a crankcase comprising an aluminum alloy or a magnesium alloy or cast iron or as a cylinder liner, in particular comprising cast iron, for an internal combustion engine.

Since the running surface does have exactly the required dimensions for the later operation of the workpiece after the application of the coating, the running surface for the piston is post-machined, in particular honed.

The coating can, for example, be designed as a layer containing iron such as is described in EP 1 022 351 A1 of the applicant. The layer can, for example, also comprise a material such as is described in EP 1 507 020 A2 or EP 1 174 524 A2 of the applicant. Furthermore, further suitable materials for the coating are naturally conceivable.

The thickness of the layer can in particular amount to between 30 μm and approximately 2 mm, with the layer in particular having only two different thicknesses apart from transition regions. On the one hand, a first region having a thin coating with a first thickness of 30 to 200 μm and, on the other hand, a second region having a thick coating with a second thickness of 0.5-2 mm. The heat transfer to a coolant flowing around the workpiece is thus considerably different, in particular smaller, than in the first region. Whether the heat transfer in the second region reduces or increases in this respect depends on the thermal conductivity of the material of the coating in comparison with the thermal conductivity of the material of the workpiece. If the thermal conductivity of the material of the coating is smaller than the thermal conductivity of the material of the workpiece, the heat transition in the second region reduces. In the other case, the heat transfer increases.

In an aspect of the invention, the cylinder bore of the base body has a hollow-cylindrical basic shape and at least one recessed area in the radial direction. Apart from a transition region at a margin or at margins in the axial direction, the recessed area in particular has the same depth in the radial direction. The transition region can in particular be designed as a slope, as a chamfer, a radius or a combination of different radii. The recessed area can be arranged at the margin of the cylinder bore or also spaced apart from the margin. The cylinder bore can have one or also more recessed areas in the axial direction. The cylinder bore of the base body can thus be produced simply.

The recessed area or recessed areas is/are in particular completely peripheral and this of circular ring shape. They can thus be produced particularly simply. The coating is in particular applied by way of a rotating plasma torch which is introduced into the cylinder bore. It is also possible that a stationary torch is used in conjunction with a rotating base body. If an recessed area is completely peripheral, a coating can first only be applied in the recessed area and, when it is filled, the coating can be extended to the total cylinder bore. Material thus does not first have to be applied in the production of the coating which has to be removed again in a later workstep. This allows a fast and inexpensive production of the workpiece.

In addition, in the design of the workpiece as a cylinder liner, the latter can be designed symmetrical with respect to its longitudinal axis, which allows a particular simple installation of the cylinder liner into an engine block or a crankcase.

In an aspect of the invention, the recessed area has different depths, with the depth relating to the radial extent of the recessed area outside the above-named transition regions. The recessed area in particular has a recess which is arranged in an axial marginal region of the recessed area. An axial marginal region of the recessed area is to be understood as a region which adjoins one of the named transition regions. To manage with as little material as possible on the application of the coating, it is sensible not always to apply the coating over the total axial extent of the cylinder bore, but in a locally restricted manner only in the region of the recessed area. The plasma torch thus only has to reverse within the cylinder bore, and indeed in the named axial marginal regions of the recessed area. This has the result that more material is applied in the region of the reversal points and thus in the marginal regions than outside the marginal regions. If the cylinder bore has a constant depth, this material in the marginal regions has to be removed again in a post-treatment. If, in contrast, the recessed area has a recess in the marginal regions, the additional material can at least be received in part in the recess, which makes a smaller effort possible and thus an inexpensive post-treatment.

The recessed area can be arranged at the margin of the cylinder bore or within the cylinder bore. On an arrangement at the margin of the cylinder bore, the recessed area in particular only has a recess at the transition region disposed opposite the margin of the cylinder bore. In the other case, it in particular has a respective recess at both transition regions.

In an aspect of the invention, the recessed area has a depth between 0.5 and 2 mm and a height in the axial direction between 5 and 50 mm.

In an aspect of the invention, the coating has a first layer and a second layer, with the first layer being arranged at least sectionally above the second layer. The two layers in this respect have different properties and in particular comprise different materials. A second layer in the form of a thermal barrier coating is, for example, arranged between the first layer, which forms the running surface, and the base body. The thermal barrier coating can in this respect be formed in the total region of the running surface for the piston or only in one or more part regions thereof. The thermal barrier coating can, for example, only be formed within the above-named recessed areas. The material of the second layer can also be selected such that an increased heat transfer results. The second layer can also be designed as a so-called undercoat which allows a particularly strong connection between the workpiece and the first layer. The undercoat can also have an effect on the heat transfer.

The heat transfer from the cylinder bore to the environment can be set particularly exactly by the provision of the second layer and in particular of a thermal barrier coating.

The coating can also have more than two layers, that is, for example, three or four different layers.

In an aspect of the invention, only the first layer forms the running surface for the piston. The second layer is thus arranged between the first layer and the workpiece in the total region of the running surface.

The above-described recesses at marginal regions of the recessed area are in particular advantageous when the coating has two layers and only the first layer should form the running surface for the piston. There is the risk without the named recesses that so much material has to be removed in the post-treatment in the marginal regions of the recessed area that the first layer becomes unacceptably thin or even no longer covers the second layer. An unwanted or even unacceptable contact of the piston with the second layer would then occur. The named recesses thus make it possible that the desired coating can also be reliably produced in this case.

In an aspect of the invention, the second layer forms the running surface in the region of the recessed area and otherwise the first layer. This is in particular realized such that first the second layer is applied with a constant thickness and subsequently the first layer is applied over the second layer. The layers thus follow the contour of the recessed area. On the post-treatment of the running surface, that is in particular on the honing, a treatment plane and thus the position and contour of the running surface are fixed such that the first layer forms the running surface in desired regions in the environment of the recessed area and otherwise the second layer. A running surface can thus be provided in a simple and inexpensive manner with sectionally different properties.

The second layer can, for example, be composed of a tough metallic material with a high service life, whereas the first layer can, for example, have a ceramic character. The ceramic character has advantages in the reduction of friction. The first layer can also be designed as a metallic layer which is produced with a powder which is coarser in comparison with the second layer and which has a particle size of approximately 30-60 µm, which typically results in a higher surface porosity. The increased surface porosity can in this respect assist a piston ring of the piston in reaching a state of a so-called hydrodynamic lubrication faster or in reducing the tendency to scuffing, for example.

The thermal barrier coating in particular comprises a ceramic material. It can, for example, be produced from a powder which comprises 75 percent by weight zirconium oxide ($ZrO_2$), between 18 and 22 percent by weight yttrium oxide ($Y_2O_3$) and further oxides as the remainder. Such a powder is marketed by the applicant under the sales name "Metco 202NS". The thermal barrier coating, for example, has a thickness between 0.5 and 2 mm. A particularly small heat transfer from the cylinder bore to the environment can thus be achieved in the regions with a thermal barrier coating.

The second layer can also comprise another suitable material such as an alloy of iron or cobalt and/or nickel as well as of chromium, aluminum and yttrium, which are known as so-called MCrAlY alloys. Such alloys are frequently used as undercoats.

The coating can also have more than two different layers with different properties and/or compositions.

In an aspect of the invention, the coating is applied via a thermal spray process, in particular by utilizing a plasma spray process. The coating can thus be applied particularly inexpensively. In addition, a particularly resistant coating can thus be applied.

The application of the coating is in particular carried out by way of a plasma spray process at atmospheric pressure, that is by using a so-called APS coating process. A high-quality coating can thus be produced particularly inexpensively. The coating material can, for example, be present in powder form. The particle size can in this respect amount to between 5 and 90 µm.

Other thermal coating processes such as high velocity flame spraying or arc spraying can also be used.

The invention also provides for a cylinder bore coating system comprising at least one cylinder bore configured to receiving an axially movable piston. The at least one cylinder bore comprising a recessed area having an axial length and a radial depth. A first coating layer is arranged within at least the recessed area. A second coating layer covers the first coating layer and a portion of the at least one cylinder bore axially spaced from the recessed area.

In embodiments, at least one of the at least one cylinder bore is arranged on an engine block of an internal combustion engine and the at least one cylinder bore comprises plural cylinder bores.

In embodiments, the recessed area is arranged in an area of the at least one cylinder bore between upper and lower ends of the at least one cylinder bore.

In embodiments, the recessed area is arranged in an area of an upper end of the at least one cylinder bore.

In embodiments, one of an inside surface of the second coating layer forms a cylindrical running surface that is frictionally engaged by the piston and an inside surface of the second coating layer forms a honed cylindrical running surface.

In embodiments, the recessed area has different heat transfer than the portion of the at least one cylinder bore axially spaced from the recessed area.

In embodiments, the first coating layer is a thermal barrier coating.

In embodiments, at least one of the first coating layer and the second coating layers are made of different materials and the first coating layer and the second coating layers have different thicknesses.

In embodiments, at least one of the first coating layer has lower thermal conductivity than a wall of the at least one cylinder bore in a region of the recessed area and the first coating layer has different thermal conductivity than a wall of the at least one cylinder bore in a region of the recessed area.

In embodiments, the coating system further comprises at least one transition area extending between the recessed area and the portion of the at least one cylinder bore axially spaced from the recessed area.

In embodiments, the coating system further comprises a first transition area extending between the recessed area and a first portion of the at least one cylinder bore axially spaced from the recessed area and a second transition area extending between the recessed area and a second portion of the at least one cylinder bore axially spaced from the recessed area.

In embodiments, the first coating layer has an axial length that is less than an axial length of the second coating layer.

In embodiments, the first and second coating layers are plasma coating layers.

In embodiments, the first coating layer is made of a metallic material and the second coating layer is made of a ceramic material.

In embodiments, the radial depth of the recessed area is between 0.5 and 2 mm.

In embodiments, the axial length of the recessed area is between 5 and 50 mm.

The invention also provides for a cylinder bore coating system comprising at least one metal cylinder bore configured to receiving an axially movable piston. The at least one cylinder bore comprises a recessed area having an axial length and a radial depth. A thermal barrier coating layer is arranged within at least the recessed area. A coating layer made of a different material than the thermal barrier coating layer covers the thermal barrier coating layer and one or more portions of the at least one cylinder bore axially spaced from the recessed area.

In embodiments, the at least one cylinder bore is a cylinder bore liner.

The invention also provides for a cylinder bore coating system comprising at least one cylinder bore configured to receiving an axially movable piston. The at least one cylinder bore comprises a recessed area having a radial depth and an axial length that is greater than the radial depth. The recessed area is arranged one of at an upper end of the at least one cylinder bore and between upper and lower portions of the at least one cylinder bore. A first coating layer is arranged within at least the recessed area. A second coating layer covers the first coating layer and one of an area of the at least one cylinder bore arranged below the recessed area and the upper and lower portions of the at least one cylinder bore.

In embodiments, the at least one cylinder bore is a metal cylinder bore liner.

The invention also provides for a method of coating at least one cylinder bore using the cylinder bore coating system of the type described herein, wherein the method comprises applying a first coating layer in at least the recessed area and applying a second coating layer over the first coating layer and over at least one portion of the at least one cylinder bore axially spaced from the recessed area.

The invention also provides for a cylinder bore coating system comprising at least one cylinder bore configured to receiving an axially movable piston. The at least one cylinder bore comprises a recessed area having a radial depth and an axial length that is greater than the radial depth. The recessed area is arranged one of at an upper end of the at least one cylinder bore and between upper and lower portions of the at least one cylinder bore. A first coating layer is arranged over at least the recessed area. A second coating layer arranged over the recessed area and one of an area of the at least one cylinder bore arranged below the recessed area and the upper and lower portions of the at least one cylinder bore.

BRIEF DESCRIPTION OF THE DRAWINGS

Further advantages, features and details of the invention result with reference to the following description of embodiments and with reference to the drawings in which elements which are the same or have the same function are provided with identical reference numerals.

In the drawings, there is shown the following.

DETAILED DESCRIPTION OF THE EMBODIMENTS

Figure 1:
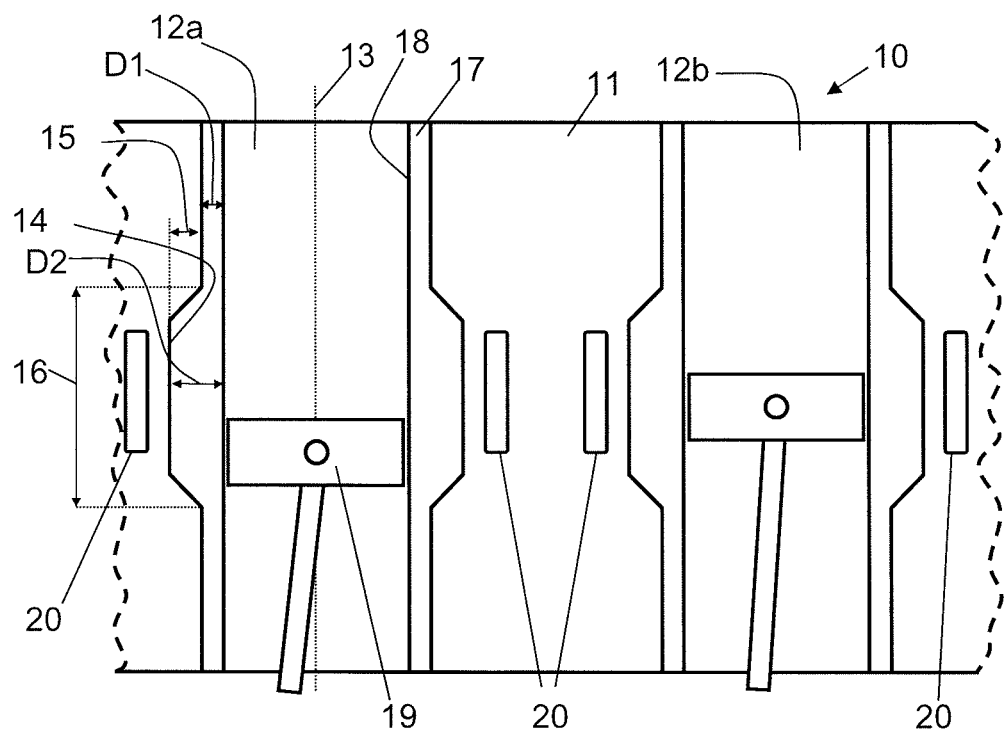
FIG. 1 shows a section of a crankcase with two internally coated cylinders.

A section of a workpiece designed as a crankcase 10 of an internal combustion engine, not further shown, is shown in FIG. 1. The crankcase 10 is not to scale and is only shown very schematically. The parts of relevance here are in particular shown greatly magnified.

The crankcase 10 comprises aluminum and has a base body 11 which has a total of four cylinder bores in the faun of cylinders of which, however, only two cylinder bores 12a, 12b are shown. The cylinder bores 12a, 12b shown are of identical design so that the descriptions apply equally to both cylinder bores 12a, 12b.

The cylinder bores 12a, 12b have a hollow cylindrical base shape which has a recessed area 14 which is arranged approximately centrally with respect to an axial direction 13 and is directed outwardly and thus in the radial direction. It thus results that the cylinder bore 12a, 12b of the base body 11 has a shape differing from a hollow-cylindrical shape. The recessed area 14 is completely peripheral and thus has a cross-section of circular ring shape. Transitions from the hollow-cylindrical base shape to the recessed area 14 are each designed as a slope. The recessed area 14 has a depth 15 in the radial direction of 0.5 to 2 mm, that is of 1 mm, for example, with respect to the hollow-cylindrical base shape. A height 16 of the recessed area 14 amounts to between 5 and 50 mm, that is 20 mm, for example, with a diameter of the hollow-cylindrical base shape being able to amount to 80 mm, for example. The height 16 of the cylinder bore 14 is in this respect considered as the axial extent of the region differing from the hollow-cylindrical base shape.

The cylinder bore 12a, 12b has a coating 17 which forms a running surface 18 for a piston 19 arranged within the cylinder bore 12a, 12b. The running surface 18 is hollow cylindrical and the piston 19 can move in a known manner in the axial direction 13 within the cylinder bore 12a, 12b. The piston 19 in this respect moves beyond the recessed area 14 in the operation of the internal combustion engine. The coating 17 is applied using an APS plasma spray process and is subsequently post-treated using a honing process. The coating 17 is manufactured using a material containing iron such as is described in EP 1 022 351 A1 of the applicant. On application of the coating 17, the coating 17 is first applied within the total cylinder bore 12a, 12b. When a sufficient layer thickness is achieved outside the recessed area 14, coating is continued in a targeted manner only in the region of the recessed area 14.

However, only a coating within the recessed area can first be applied and, only when it is filled, also outside the recessed area. A further possibility is to apply such a thick coating within the whole cylinder bore during the total coating process that a hollow cylindrical running surface can arise on a post-treatment.

A non-uniform thickness of the coating 17 results in the radial direction due to the combination of a hollow-cylindrical running surface 18 and the shape of the cylinder bore 12a, 12b differing from a hollow-cylindrical shape. The coating 17 is admittedly of the same thickness all around at a specific axial position; however, the thickness can be different at another axial position.

In the axial direction 13 outside the recessed area 14, the coating 17 has a first thickness D1 of 100 to 200 μm, that is, for example 150 μm. The thickness increases over the slopes of the recessed area 14 up to a maximum second thickness D2 of 0.5-21 mm, that is, for example, 1 mm.

The base body 11 of the crankcase 10 additionally has coolant channels 20 in which a coolant circulates and transports heat away from the crankcase 10 in operation of the internal combustion engine. The coolant channels 20 extend around the cylinder bores 12a, 12b and are arranged in the region of the recessed area 14.

Figure 2:
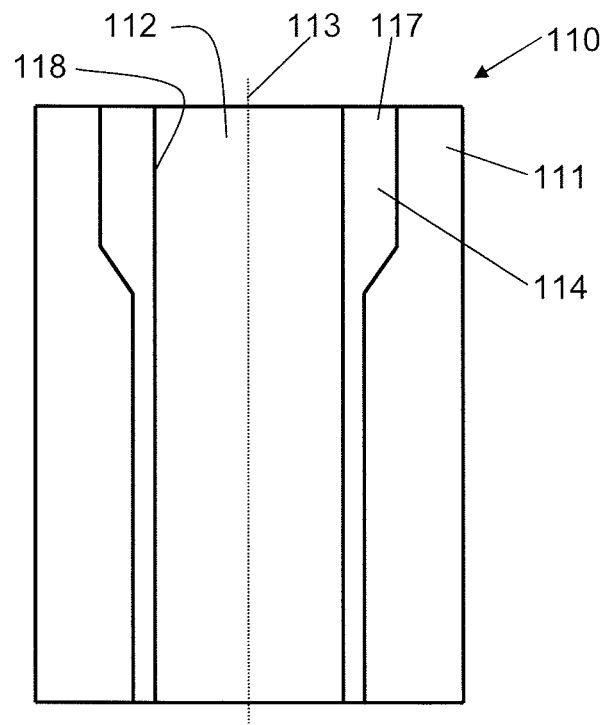
FIG. 2 shows a sectional representation of an internally coated cylinder liner.

A workpiece designed as a cylinder liner 110 is shown in FIG. 2. The cylinder liner 110 is provided to be used in a crankcase, not shown, of an internal combustion engine. The cylinder liner 110 is not to scale and is only shown very schematically. The parts of relevance here are in particular shown greatly magnified.

The cylinder liner 110 comprises cast iron and has a base body 111 which has a cylinder bore 112. The cylinder bore 112 has a hollow-cylindrical base shape which has a recessed area 114 directed outwardly at the margin with respect to an axial direction 113 and thus directed in the radial direction. It thus results that the cylinder bore 112 of the base body 111 has a shape differing from a hollow-cylindrical shape. The recessed area 114 is likewise completely peripheral and thus has a cross-section of circular ring shape. A transition from the recessed area 114 to the hollow-cylindrical base shape is designed as a slope. The depth and the length of the recessed area 114 are comparable with those of the recessed area 14 of FIG. 1.

The cylinder bore 112 has a coating 117 which forms a hollow cylindrical running surface 118 for a piston, not shown, which can be arranged within the cylinder bore 112. The coating 117 comprises the same material and is manufactured using the same method as the coating 17 of FIG. 1.

A non-uniform thickness of the coating 117 results in the radial direction due to the combination of a hollow-cylindrical running surface 118 and the shape of the cylinder bore 112 differing from a hollow-cylindrical shape. The thickness of the coating 117 is in this respect comparable with the thickness of the coating 17 of FIG. 1.

Figure 3:
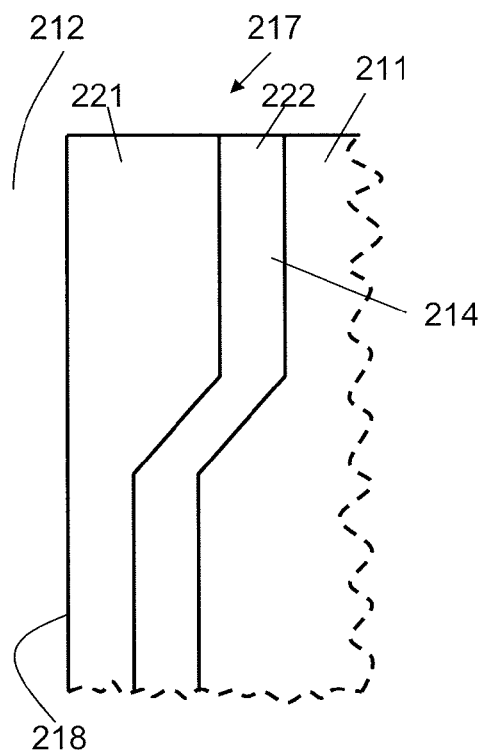
FIG. 3 shows a section of a cylinder liner with a two-layer coating in a first embodiment.
Figure 4:
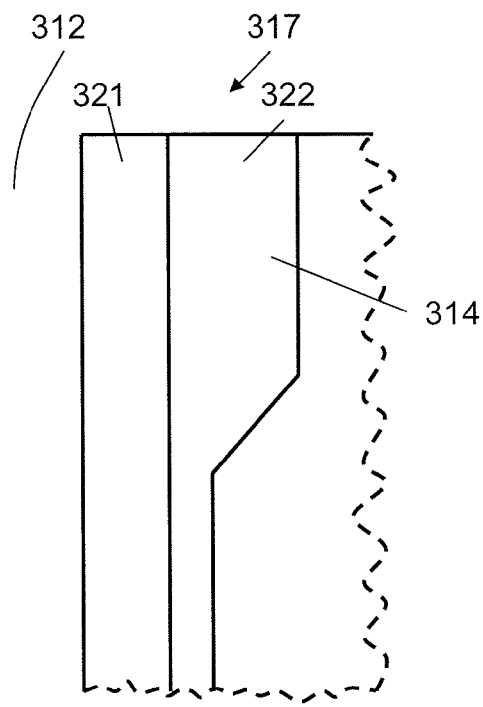
FIG. 4 shows a section of a cylinder liner with a two-layer coating in a second embodiment.
Figure 5:
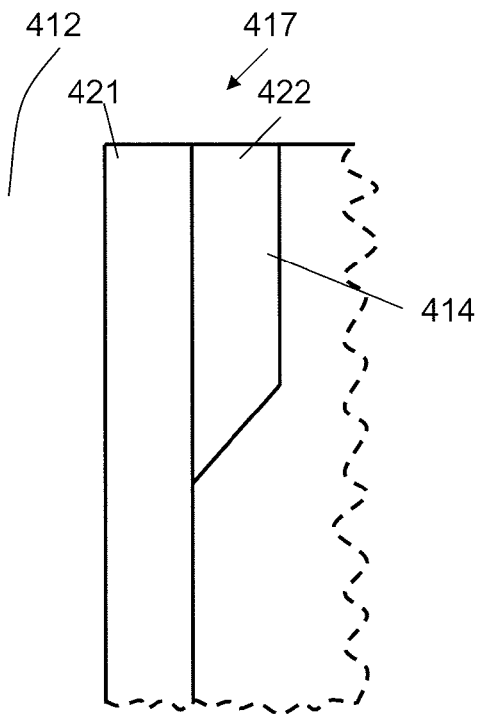
FIG. 5 shows a section of a cylinder liner with a two-layer coating in a third embodiment.

A section of a cylinder liner in accordance with FIG. 2 is shown in FIGS. 3, 4 and 5 respectively. In this respect, a respective section is shown with an recessed area of a cylinder bore. The base bodies and cylinder bores in FIGS. 3, 4 and 5 have an identical design. The embodiments only differ in the manner of the coating, with all three coatings comprising two different layers lying over one another.

In accordance with the embodiment corresponding to FIG. 3, a coating 217 of a cylinder bore 212 has a first layer 221 which forms a running surface 218 for a piston, not shown. The layer 221 comprises the same material and is manufactured using the same method as the coating 17 of FIG. 1. The thickness of the coating 217 is in this respect also comparable with the thickness of the coating 17 of FIG. 1.

A second layer in the form of a thermal barrier coating 222 is arranged over the complete axial extent between the first layer 221 and a base body 211. The thermal barrier coating 222 comprises a ceramic material, and indeed a powder which is marketed by the applicant under the sales name "Metco 202NS". The thermal barrier coating has a uniform thickness between 0.5 and 2 mm, that is, for example, 1 mm. The thermal barrier coating 222 is likewise applied by means of an APS plasma spray process.

So that the running surface 218 is of hollow cylindrical design, the first layer 221 has a thickness variable in the axial direction comparable to the coating 117 of FIG. 2. A recessed area 214 of the cylinder bore 212 and the uniform thickness of the thermal barrier coating 222 are thus compensated.

The embodiment in accordance with FIG. 4 only differs a little from the embodiment in accordance with FIG. 3 so that only the differences will be looked at. In the embodiment in accordance with FIG. 4, a first layer 321 of a coating 317 has a uniform thickness and a thermal barrier coating 322 has a variable thickness. The thermal barrier coating 322 is designed so that it compensates a recessed area 314 of a cylinder bore 312 so that the first layer 321 can already be applied to a hollow-cylindrical contour.

The embodiment in accordance with FIG. 5 only differs a little from the embodiment in accordance with FIG. 4 so that only the differences will be looked at. In the embodiment in accordance with FIG. 5, a thermal barrier coating 422 of a coating 417 is designed so that it only fills a recessed area 414 of a cylinder bore 412 such that a hollow-cylindrical contour arises onto which a uniformly thick first layer 421 can be applied.

Figure 6:
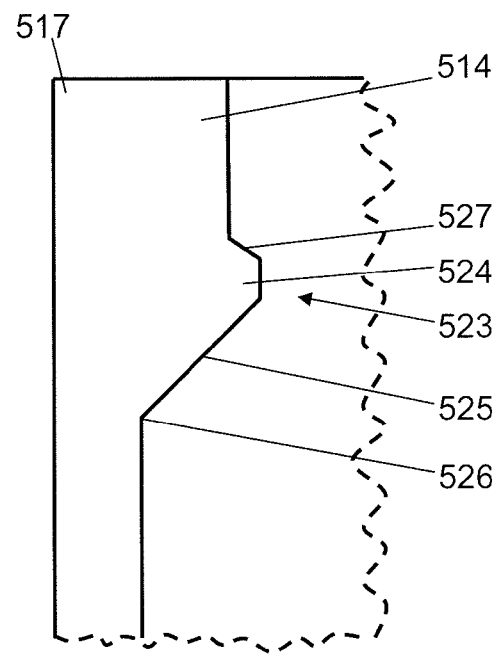
FIG. 6 shows a section of a cylinder liner with a single-layer coating in a second embodiment.

The embodiment in accordance with FIG. 6 only differs a little from the embodiment in accordance with FIG. 2 so that only the differences will be looked at. In the embodiment in accordance with FIG. 6, a recessed area 514 has a differing depth. The recessed area 514 has a peripheral recess 524 in an axial marginal region 523. The recess 524 is arranged such that it is connected via a constant chamfer 526 to a margin 526 of the recessed area 514. The recess 524 likewise has a chamfer 527 on the side disposed opposite the margin 526. The recess 524 serves to receive material, which is additionally deposited on the reversal of a plasma torch, on an application of a coasting 517 only in the region of the recessed area 514.

Figure 7:
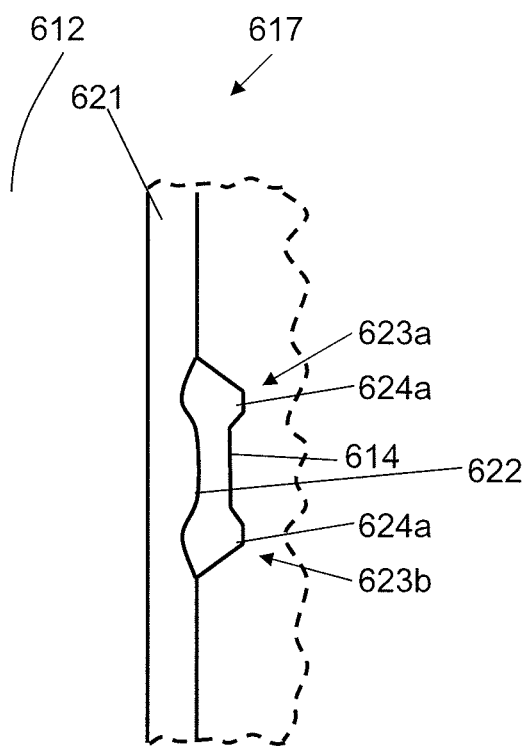
FIG. 7 shows a section of a cylinder liner with a two-layer coating in a fourth embodiment.

In the embodiment in accordance with FIG. 7, a recessed area 614 of a cylinder bore 612 has an arrangement and a contour generally comparable with the recessed areas 14 in accordance with FIG. 1. In addition to these, the recessed area 614 has recesses 624a, 624b corresponding to the recess 524 in accordance with FIG. 6 at its two axial marginal regions 623a, 623b. A coating 617 has a first layer 621 and a second layer 622, with the second layer 622 only having been applied in the region of the recessed area 614.

Figure 8:
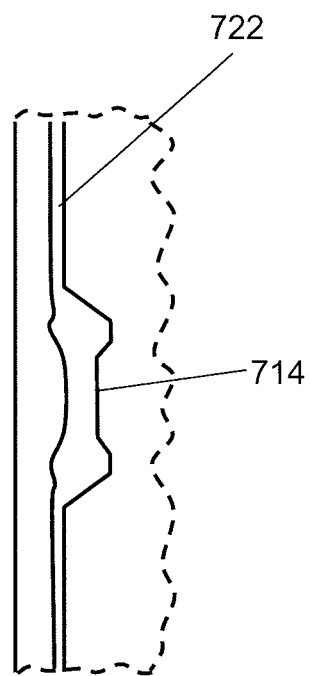
FIG. 8 shows a section of a cylinder liner in accordance with FIG. 7 with a two-layer coating designed differently in comparison therewith.

The embodiment in accordance with FIG. 8 only differs from the embodiment in accordance with FIG. 7 in that a second layer 722 is arranged not only in the region of a recessed area 714, but also outside it.

Figure 9:
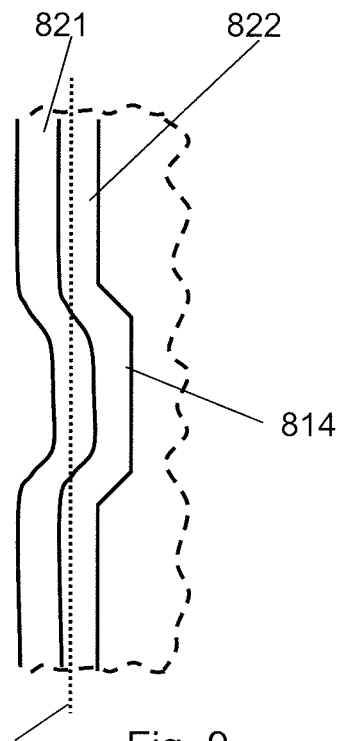
FIG. 9 shows a section of a cylinder liner with a two-layer coating in a fifth embodiment.

The embodiment in accordance with FIG. 9 only differs a little from the embodiment in accordance with FIG. 1 so that only the differences will be looked at. A recessed area 814 likewise has a constant depth. A second layer 822 is applied first and over it a first layer 821 having a respective approximately constant thickness. The two layers 821, 822 thus largely follow the contour of the recessed area 814. On a subsequent post-treatment, a treatment plane is fixed so that the first layer 821 forms the running surface 818 in the environment of the recessed area 814 and otherwise the second layer 822.

NON-LIMITING EXAMPLES

The invention also provides for a cylinder bore coating system comprising at least one cylinder bore (e.g., 12a) configured to receiving an axially movable piston (e.g., 19). The at least one cylinder bore (12a) comprising a recessed area (e.g., 14) having an axial length (16) and a radial depth (D2). A first coating layer (e.g., 222) is arranged within at least the recessed area (e.g., 214). A second coating layer (e.g., 221) covers the first coating layer (222) and a portion of the at least one cylinder bore axially spaced from the recessed area.

The invention also provides for a cylinder bore coating system comprising at least one cylinder bore configured to receiving an axially movable piston. The at least one cylinder bore comprises a recessed area (814) having a radial depth and an axial length that is greater than the radial depth. The recessed area (814) is arranged one of at an upper end of the at least one cylinder bore (see FIGS. 2-6) and between upper and lower portions of the at least one cylinder bore (see FIGS. 1 and 7-9). A first coating layer (821) is arranged over at least the recessed area (814). A second coating layer (822) arranged over the recessed area (814) and one of an area of the at least one cylinder bore arranged below the recessed area and the upper and lower portions of the at least one cylinder bore.

What is claimed:

1. A cylinder bore coating system comprising:
   at least one cylinder bore configured to receive an axially movable piston;
   said at least one cylinder bore comprising an annular recessed area having an axial length and a radial depth; and
   a first coating layer arranged within at least the recessed area; and
   a second coating layer covering the first coating layer and a portion of the at least one cylinder bore axially spaced from the recessed area.

2. The coating system of claim 1, wherein at least one of:
   the at least one cylinder bore is arranged on an engine block of an internal combustion engine; and
   the at least one cylinder bore comprises plural cylinder bores.

3. The coating system of claim 1, wherein the recessed area is arranged in an area of the at least one cylinder bore between upper and lower ends of the at least one cylinder bore.

4. The coating system of claim 1, wherein the recessed area is arranged in an area of an upper end of the at least one cylinder bore.

5. The coating system of claim 1, wherein one of:
   an inside surface of the second coating layer forms a cylindrical running surface that is frictionally engaged by the piston; and
   an inside surface of the second coating layer forms a honed cylindrical running surface.

6. The coating system of claim 1, wherein the recessed area has different heat transfer than the portion of the at least one cylinder bore axially spaced from the recessed area.

7. The coating system of claim 1, wherein the first coating layer is a thermal barrier coating.

8. The coating system of claim 1, wherein at least one of:
   the first coating layer and the second coating layers are made of different materials; and
   the first coating layer and the second coating layers have different thicknesses.

9. The coating system of claim 1, wherein at least one of:
   the first coating layer has lower thermal conductivity than a wall of the at least one cylinder bore in a region of the recessed area; and
   the first coating layer has different thermal conductivity than a wall of the at least one cylinder bore in a region of the recessed area.

10. The coating system of claim 1, further comprising at least one transition area extending between the recessed area and the portion of the at least one cylinder bore axially spaced from the recessed area.

11. The coating system of claim 1, further comprising a first transition area extending between the recessed area and a first portion of the at least one cylinder bore axially spaced from the recessed area and a second transition area extending between the recessed area and a second portion of the at least one cylinder bore axially spaced from the recessed area.

12. The coating system of claim 1, wherein the first coating layer has an axial length that is less than an axial length of the second coating layer.

13. The coating system of claim 1, wherein the first and second coating layers are plasma coating layers.

14. The coating system of claim 1, wherein the first coating layer is made of a metallic material and the second coating layer is made of a ceramic material.

15. The coating system of claim 1, wherein the radial depth of the recessed area is between 0.5 and 2 mm.

16. The coating system of claim 1, wherein the axial length of the recessed area is between 5 and 50 mm.

17. A cylinder bore coating system comprising:
at least one metal cylinder bore configured to receive an axially movable piston;
said at least one cylinder bore comprising an annular recessed area having an axial length of between 5 and 50 mm and a radial depth of between 0.5 and 2 mm; and
a thermal barrier coating layer arranged within at least the recessed area; and
a second coating layer made of a different material than the first coating layer and covering the first coating layer and one or more portions of the at least one cylinder bore axially spaced from the recessed area.

18. The coating system of claim 17, wherein the at least one cylinder bore is a cylinder bore liner.

19. A cylinder bore coating system comprising:
at least one cylinder bore configured to receive an axially movable piston;
said at least one cylinder bore comprising an annular recessed area extending around an entirely of said cylinder bore and having a radial depth of between 0.5 and 2 mm and an axial length that is greater than the radial depth;
said recessed area arranged one of:
at an upper end of the at least one cylinder bore; and
between upper and lower portions of the at least one cylinder bore;
a first coating layer arranged over at least the recessed area; and
a second coating layer arranged over the recessed area and one of:
an area of the at least one cylinder bore arranged below the recessed area; and
the upper and lower portions of the at least one cylinder bore.

20. The coating system of claim 19, wherein the at least one cylinder bore is a metal cylinder bore liner.

21. A method of coating at least one cylinder bore using the cylinder bore coating system of claim 1, the method comprising:
applying a first coating layer in at least the recessed area; and
applying a second coating layer over the first coating layer and over at least one portion of the at least one cylinder bore axially spaced from the recessed area.

* * * * *